US009189432B2

(12) United States Patent
Teyssier et al.

(10) Patent No.: US 9,189,432 B2
(45) Date of Patent: Nov. 17, 2015

(54) APPARATUS AND METHOD FOR PREDICTING TARGET STORAGE UNIT

(75) Inventors: Melanie Emanuelle Lucie Teyssier, Grasse (FR); Florent Begon, Antibes (FR); Jocelyn Francois Orion Jaubert, Antibes (FR); Nicolas Jean Phillippe Huot, Valbonne (FR)

(73) Assignee: ARM Limited, Cambridge (GB)

(*) Notice: Subject to any disclaimer, the term of this patent is extended or adjusted under 35 U.S.C. 154(b) by 714 days.

(21) Appl. No.: 12/926,394

(22) Filed: Nov. 15, 2010

(65) Prior Publication Data

US 2012/0124300 A1    May 17, 2012

(51) Int. Cl.
| | | |
|---|---|---|
| G06F 15/00 | (2006.01) | |
| G06F 7/38 | (2006.01) | |
| G06F 9/44 | (2006.01) | |
| G06F 9/00 | (2006.01) | |
| G06F 13/16 | (2006.01) | |
| G06F 9/34 | (2006.01) | |
| G06F 9/38 | (2006.01) | |

(52) U.S. Cl.
CPC .......... *G06F 13/16* (2013.01); *G06F 9/34* (2013.01); *G06F 9/3832* (2013.01)

(58) Field of Classification Search
None
See application file for complete search history.

(56) References Cited

U.S. PATENT DOCUMENTS

| | | | |
|---|---|---|---|
| 2002/0091915 A1* | 7/2002 | Parady | 712/225 |
| 2003/0037217 A1 | 2/2003 | Middleton et al. | |
| 2003/0074540 A1* | 4/2003 | Arimilli et al. | 711/204 |
| 2009/0182992 A1* | 7/2009 | Greiner et al. | 712/225 |
| 2010/0049953 A1* | 2/2010 | Mylavarapu et al. | 712/225 |

OTHER PUBLICATIONS

Bekerman et al. (Correlated Load-Address Predictors, May 1999, pp. 54-63).*

* cited by examiner

*Primary Examiner* — George Giroux
(74) *Attorney, Agent, or Firm* — Nixon & Vanderhye P.C.

(57) ABSTRACT

A data processing apparatus comprises processing circuitry and a plurality of storage units. When the processing circuitry executes a data access instruction, then a storage controller identifies based on a target storage address of the data access instruction, which of the storage units includes the target storage location identified by the target storage address. Prediction circuitry is provided to predict a predicted storage unit predicted to include the target storage location, so that retrieval of the data value from the predicted storage unit can be initiated before the storage controller has identified the target storage unit. The prediction circuitry makes the prediction based on the type of the data access instruction executed by the processing circuitry.

19 Claims, 6 Drawing Sheets

ITCM storage locations:

| | |
|---|---|
| 0 | Instruction |
| 1 | Instruction |
| 2 | LDR r0, pc, #7 |
| 3 | Instruction |
| 4 | LDR r3, r4, r5 |
| 5 | Instruction |
| 6 | Instruction |
| 7 | LDR r0, pc, #3 |
| 8 | Branch 42 |
| 9 | Data A |
| A | Data B |
| ⋮ | |
| 42 | Instruction |

APPARATUS AND METHOD FOR PREDICTING TARGET STORAGE UNIT

FIELD OF THE INVENTION

The present invention relates to the field of data processing. More particularly, the invention relates to predicting which of a plurality of storage units contains a requested data value.

BACKGROUND OF THE INVENTION

Some processing apparatuses are provided with multiple storage units for storing data and/or instructions on behalf of a processing circuit. When the processing circuit requests access to a data value (whether a read access for reading the current value of the data value or a write access for writing a new value of the data value), the circuit determines which of the storage units stores the requested data value. Determining which storage unit contains the target data can take several processing cycles, and so waiting for the target storage unit to be determined before initiating the read or write access can slow down processing performance.

For faster performance, some processing apparatuses can predict which of the storage units contains the target data, and initiate access to the predicted storage unit before it has been determined which storage unit actually stores the target data. Hence, it is not necessary to wait for the actual determination of the target storage unit before the data access can be initiated. The prediction may be made in dependence on part of the target storage address of the access request. The present technique seeks to provide an efficient way of predicting which storage unit stores the target data.

SUMMARY OF THE INVENTION

The present invention provides a data processing apparatus comprising:
processing circuitry configured to execute program instructions to process data;
a plurality of storage units comprising storage locations addressable by storage addresses; and
a storage controller configured to control access to said plurality of storage units; wherein:
said storage controller is configured such that, when said processing circuitry executes a data access instruction for controlling said processing circuitry to access a target storage location addressed by a target storage address, said storage controller identifies based on said target storage address which of said plurality of storage units is a target storage unit that includes said target storage location;
said data processing apparatus comprises prediction circuitry configured to detect whether said processing circuitry is executing a data access instruction of a predetermined type, and, upon detecting said processing circuitry executing said data access instruction of said predetermined type, to predict based on the type of data access instruction a predicted storage unit predicted to include said target storage location; and
said storage controller is configured to initiate a data access to said predicted storage unit before said storage controller has identified said target storage unit.

The present technique recognises that there are certain types of data access instruction for which it is reasonably predictable which of a plurality of storage units will be accessed in response to that instruction. Hence, prediction circuitry can be arranged to detect whether processing circuitry is executing a predetermined type of data access instruction, and upon detecting execution of the predetermined type of instruction, to predict based on the type of data access instruction which storage unit is predicted to include the target storage location. This form of prediction is relatively efficient because, by making the prediction based on the instruction type, the prediction circuitry need not comprise address comparators for analysing portions of the target storage address, and so a fast prediction can be made with a low power overhead.

The data access instruction may be a load instruction for triggering a read access to a target storage location, or a store instruction for triggering a write access to a target storage location.

The predetermined type of data access instruction may be distinguished from other types of data access instruction in a number of ways. For example, the data access instruction of the predetermined type may have a different opcode to other kinds of data access instruction. Alternatively, the predetermined type of data access instruction may have the same opcode as another type of data access instruction but may, for example, use a different addressing mode, or may reference a different register. Hence, the predetermined type of data access instruction may be any category of data access instruction that can be distinguished from other categories of data access instruction in some way, and for which an instruction-type-specific prediction is made by the prediction circuitry.

For the data access instruction of the predetermined type, the prediction circuitry may be configured to predict the predicted storage unit based on which storage unit was identified by the storage controller as the target storage unit on execution of a previous data access instruction of the predetermined type. This type of prediction exploits the likelihood of there being a correlation between the access patterns of successive instructions of the same type. It is reasonably likely that an instruction of the predetermined type will target the same storage unit as a previous instruction of the predetermined type. By predicting the predicted storage unit based on the target storage unit identified on a previous execution of an instruction of the predetermined type, an efficient prediction can be made.

It is possible that the predication circuitry may incorrectly predict the predicted storage unit. If the prediction is incorrect, then the predicted storage unit identified by the prediction circuitry will differ from the actual target storage unit, and so the access request will have been directed to the wrong storage unit. To recover from prediction errors, prediction monitoring circuitry may be provided to determine, after the storage controller has identified the actual target storage unit, whether the prediction was correct, and to control the storage controller to reinitiate the data access to the target storage unit if there was an incorrect prediction by the prediction circuitry. Hence, data accesses can be replayed if the prediction was incorrect. Generally, prediction errors are relatively infrequent, so the performance penalty associated with occasionally replaying the data access would usually be outweighed by the performance gain achieved for a correct prediction by initiating the data access early.

It is possible to provide the prediction circuitry, storage controller, prediction monitoring circuitry and processing circuitry as separate circuits. However, in other embodiments, several of these circuits may be combined. For example, the prediction circuitry and prediction monitoring circuitry may be part of the storage controller. Also, the storage controller and/or the prediction circuitry may be part of the processing circuitry, such that the processing circuitry itself performs the access control and/or prediction operations of the storage controller and/or prediction circuitry.

In one embodiment, said data processing apparatus comprises a program counter indicating a storage address of a storage location storing a program instruction currently being executed by said processing circuitry; and said data access instruction of said predetermined type is a program-counter-relative load instruction for controlling said processing circuitry to request a data value from a target storage location addressed by a target storage address determined using said program counter.

One type of data access instruction to which the present technique can be applied is a program-counter-relative load instruction. The data processing apparatus maintains a program counter to indicate the storage address of a currently executed instruction. The program-counter-relative load instruction controls the processing circuit to request a data value from a target storage location whose storage address is determined using the program counter. The target storage unit of a program-counter-relative load instruction is often reasonably predictable and so it can be useful to provide prediction circuitry which performs a type-specific prediction for such a program-counter-relative load instruction.

This technique is particularly useful when one of the plurality of storage units is a tightly coupled memory. A tightly coupled memory (TCM) is a low latency memory provided local to the processor. In some systems, the program-counter-relative load instruction is often used to access the tightly coupled memory, and so this correlation can be exploited to make a prediction of the access target of the instruction.

Upon detecting the processing circuitry executing the program-counter-relative load instruction, the prediction circuitry may predict as the predicted storage unit;

(i) said tightly coupled memory if, on execution of a previous program-counter-relative load instruction, said storage controller identified said tightly coupled memory as said target storage unit; and (ii) another of said storage units if, on execution of said previous program-counter-relative load instruction, said storage controller identified a storage unit other than said tightly coupled memory as said target storage unit.

Hence, if a data access is performed in response to a program-counter-relative load instruction, then it is predicted as accessing the tightly coupled memory if the previous program-counter-relative load instruction triggered an access to the tightly coupled memory as the target storage unit.

The prediction circuitry may maintain a status flag which indicates whether, on execution of the previous program-counter-relative load instruction, the storage controller identified the tightly coupled memory as the target storage unit. Hence, when a new program-counter-relative load instruction is executed then the prediction circuitry can make the prediction on the basis of the current state of the status flag.

In one example, the status flag may have first state and a second state, and the prediction circuitry may be configured to;

predict said tightly coupled memory as said predicted storage unit if said status flag has said first state;

predict another of said storage units as said predicted storage unit if said status flag has said second state;

place said status flag in said first state if said storage controller identifies said tightly coupled memory as said target storage unit; and place said status flag in said second state if said storage controller identifies a storage unit other than said tightly coupled memory as said target storage unit.

Hence, when the storage controller identifies the target storage unit of a program-counter-relative load instruction, the prediction circuitry sets the status flag to indicate whether the tightly coupled memory or another storage unit is the target storage unit. On encountering another program-counter-relative load instruction, the prediction circuitry uses the current state of status flag to make the prediction of the predicted storage unit.

In one example, the program-counter-relative load instruction may identify an offset value, and the target storage address may be the sum of the offset value and the storage address indicated by the program counter. The offset value may be identified directly in the program-counter-relative load instruction as an immediate value, or may be identified indirectly with reference to a register, for example. The program-counter-relative load instruction can be used to access data values which are located at a storage location which is offset from the storage location of the currently executed program instruction (as indicated by the program counter) by a given offset value.

The program-counter-relative-load instruction may be one of a plurality of types of load instruction for controlling the processing circuitry to request a data value from a target storage location addressed by a target storage address. In one example, the different types of load instruction may be represented by instructions having different opcodes. However, in another example the different types of load instruction may have the same opcode but may use different addressing modes. Each load instruction may identify a base address and an offset value, with the target storage address being determined as the sum of the base address and the offset value. For the program-counter-relative load instruction, the base address may be identified as the storage address indicated by the program counter.

The prediction circuitry may perform a different kind of prediction for the other types of load instruction in comparison to the program-counter-relative load instruction, or alternatively may not perform any prediction for the other types of load instruction. If no prediction is made for a type of load instruction, then an access request may be triggered to multiple storage units simultaneously, so that the data access can be initiated in advance of the target storage unit being identified by the storage controller.

In one example, the tightly coupled memory is an instruction tightly coupled memory (ITCM) for storing program instructions to be executed by the processing circuitry. While the instruction tightly coupled memory is principally for storing program instructions, it may also include some data values located amongst the program instructions. These data values are known as literal values. Often, program-counter-relative load instructions are used to access the pool of literal values located within the stream of instructions. Program-counter-relative load instructions are well suited to accessing literal values because they can identify the location of the literal value relative to the location of the currently executed instruction as indicated by the program counter. This is useful because, if the program code containing the program-counter-relative load instruction and literal value is moved to a different part of the address space, the program code will not need to be modified since the program-counter-relative addressing will continue to point to the correct location of the literal value.

As program-counter-relative load instructions are often used to access literal values, and literal values often reside within the ITCM, it is reasonably likely that the program-counter-relative load instruction will be used to access the ITCM. The prediction circuitry can exploit this behaviour to make a prediction which has a reasonable probability of being correct.

Moreover, as it is likely that a programmer will use the program-counter-relative instruction for similar purposes throughout a given program, then once one program-counter-relative load instruction has accessed the ITCM, it is probable that the next program-counter-relative load instruction will also access the ITCM. Therefore, a prediction based on the target storage unit accessed by the preceding program-counter-relative instruction is reasonably likely to be accurate.

The one or more storage units other than the instruction tightly coupled memory may include at least one of an instruction cache memory, a data cache memory, and a data tightly coupled memory. Other kinds of storage unit may also be used.

Another kind of data access instruction for which an instruction type-specific prediction of a target storage unit may be made is a stack access instruction for controlling the processing circuitry to access a data value in a stack data structure. A stack data structure is a last-in-first-out data structure which can be used, for example, for storing temporary variables. When a data value is written to the stack, it is placed at the top of the stack, while when a data value is read from the stack it is taken from the top of the stack. A stack pointer is typically maintained for indicating the storage location representing the top of the stack data structure. For example, the stack pointer may indicate the storage location of the data value most recently added to the stack, or may indicate the storage location for storing the next data value to be added to the stack. The stack pointer is modified as data values are pushed onto the stack and popped from the stack.

As the location of the stack data structure within the plurality of storage units is relatively predictable, then a stack access instruction, which controls the processing circuitry to access a target storage location addressed by an address determined using the stack pointer, can be treated as a predetermined type of instruction for which the prediction circuitry makes a prediction based on the instruction type.

For example, the plurality of storage units may comprise a stack memory for storing the stack data structure. Although most of the time the stack data structure would be expected to reside within the stack memory, if many data values are added to the stack data structure then the stack may exceed the memory space available in the stack memory. Hence, it is possible that the stack may be stored in another storage unit as well as the stack memory.

Using the present technique, the prediction circuitry may, upon detecting execution of stack access instruction, predict as the predicted storage unit:

(i) said stack memory if, on execution of a previous stack access instruction, said storage controller identified said stack memory as said target storage unit; and (ii) another of said storage units if, on execution of said previous stack access instruction, said storage controller identified a storage unit other than said stack memory as said target storage unit.

If the previous stack access instruction accessed the stack memory, then it is likely that the next stack access instruction will also access the stack memory, and so the stack memory can be predicted as the predicted storage unit. On the other hand, if the previous stack access did not access the stack memory, then another storage unit can be predicted as the predicted storage unit.

In a similar way to the prediction for a program-counter-relative load instruction, the prediction for a stack access instruction may be based on a status flag indicating whether the previous stack access instruction accessed the stack memory as the target storage unit.

Viewed from another aspect, the present invention provides a data processing apparatus comprising:

processing means for executing program instructions to process data;

a plurality of storage unit means for storing data, said storage unit means comprising storage locations addressable by storage addresses; and storage control means for controlling access to said plurality of storage unit means; wherein:

said storage control means is configured such that, when said processing means executes a data access instruction for controlling said processing means to access a target storage location addressed by a target storage address, said storage control means identifies based on said target storage address which of said plurality of storage unit means is a target storage unit means that includes said target storage location;

said data processing apparatus comprises prediction means for detecting whether said processing means is executing a data access instruction of a predetermined type, and, upon detecting said processing means executing said data access instruction of said predetermined type, predicting based on the type of data access instruction a predicted storage unit means predicted to include said target storage location; and said storage control means is configured to initiate a data access to said predicted storage unit means before said storage control means has identified said target storage unit means.

Viewed from a further aspect, the present invention provides a data processing method for a data processing apparatus comprising processing circuitry configured to execute program instructions to process data, and a plurality of storage units comprising storage locations addressable by storage addresses; said method comprising the steps of:

detecting whether said processing circuitry is executing a data access instruction of a predetermined type for controlling said processing circuitry to access a target storage location addressed by a target storage address;

upon detecting said processing circuitry executing said data access instruction of said predetermined type, predicting based on the type of data access instruction a predicted storage unit predicted to include said target storage location;

initiating a data access to said predicted storage unit; and after initiating said data access to said predicted storage unit, identifying based on said target storage address which of said plurality of storage units is a target storage unit that actually includes said target storage location.

Viewed from yet another aspect, the present invention provides a data processing apparatus comprising:

processing circuitry configured to execute program instructions to process data;

a plurality of storage units comprising storage locations addressable by storage addresses, said plurality of storage units including a tightly coupled memory;

a storage controller configured to control access to said plurality of storage units; and a program counter indicating a storage address of a storage location storing a program instruction currently being executed by said processing circuitry; wherein:

said storage controller is configured such that, when said processing circuitry executes a program-counter-relative load instruction for controlling said processing circuitry to request a data value from a target storage location addressed by a target storage address determined using said program counter, said storage controller identifies based on said target storage address which of said plurality of storage units is a target storage unit that includes said target storage location;

said data processing apparatus comprises prediction circuitry configured to detect whether said processing circuitry is executing said program-counter-relative load instruction and, upon detecting said processing circuitry executing said program-counter-relative load instruction, to predict as a predicted storage unit predicted to include said target storage location:

(i) said tightly coupled memory if, on execution of a previous program-counter-relative load instruction, said storage controller identified said tightly coupled memory as said target storage unit; and (ii) another of said storage units if, on execution of said previous program-counter-relative load instruction, said storage controller identified a storage unit other than said tightly coupled memory as said target storage unit; and said storage controller is configured to initiate retrieval of said data value from said predicted storage unit before said storage controller has identified said target storage unit.

BRIEF DESCRIPTION OF THE DRAWINGS

Further objects, features and advantages of the present technique will be apparent from the following detailed description of illustrative embodiments which is to be read with reference to the accompanying drawings, in which.

DESCRIPTION OF EMBODIMENTS

Figure 1:
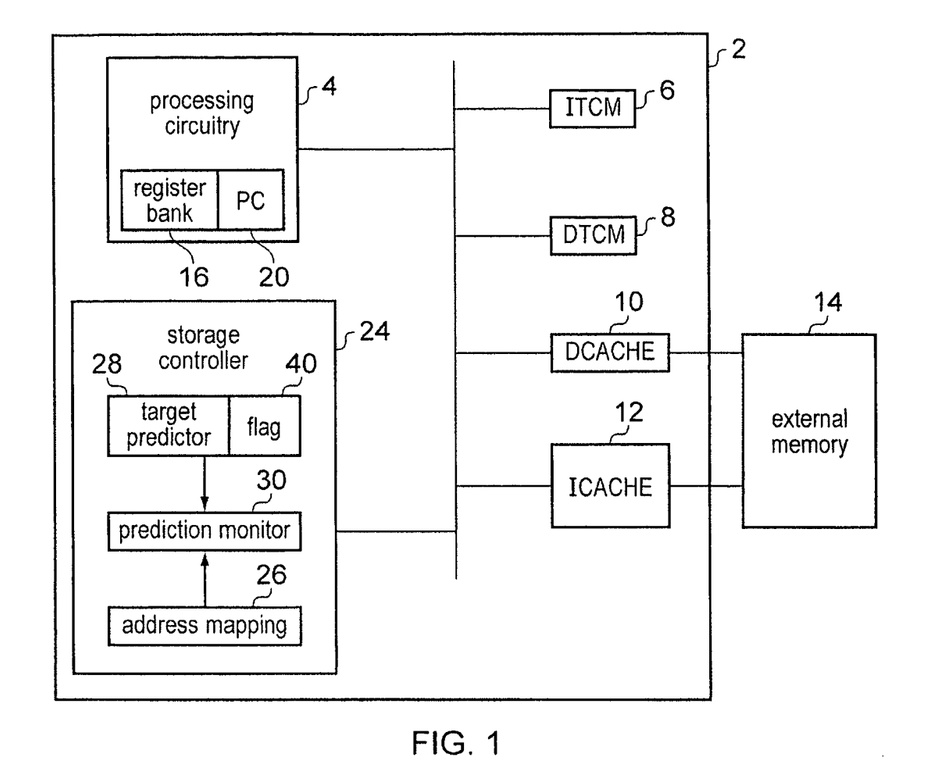
FIG. 1 schematically illustrates a data processing apparatus having a plurality of storage units.

FIG. 1 schematically illustrates a data processing apparatus comprising a processing circuit 4 and a plurality of storage units 6, 8, 10, 12. In this example, the storage units include an instruction tightly coupled memory (ITCM) 6, a data tightly coupled memory (DTCM) 8, a data cache (DCACHE) 10 and an instruction cache (ICACHE) 12. The data cache 10 and instruction cache 12 store cached versions of data stored in an external memory 14. The data and instruction caches 10, 12 have associated cache control mechanisms for controlling caching of data and instructions to the cache and eviction of data and instructions from the cache.

The tightly coupled memories (TCMs) 6, 8 store instructions and data for low latency access by the processing circuitry 4. Unlike the caches 10, 12, the TCMs 6, 8 do not have cache control mechanisms and so data placed in the TCMs 6, 8 will remain present in the TCMs 6, 8 without being evicted until the data is overwritten or deleted under control of a data access instruction. Hence, access to data and instructions in the TCMs 6, 8 is typically more deterministic than access to data and instructions in the caches 10, 12.

The processing circuitry has a bank of registers 16 for storing data values for processing by the processing circuitry 4. The processing circuitry 4 also maintains a program counter 20 indicating a storage location of a currently executing program instruction. The program counter 20 may be stored in a dedicated program counter register, for example.

The processing circuit 4 may include a processing pipeline for pipelining execution of multiple program instructions. Each instruction within the pipeline may be associated with its own version of the program counter 20. If a particular pipeline stage needs to refer to the program counter 20, then it uses the version of the program counter 20 associated with the instruction currently being processed by that pipeline stage.

A storage controller 24 is provided to control access to the storage units 6, 8, 10, 12. In some embodiments, the storage controller 24 may be an integral part of the processing circuitry 4 such that the processing circuit itself performs the operations of the storage controller 24.

Figure 2:
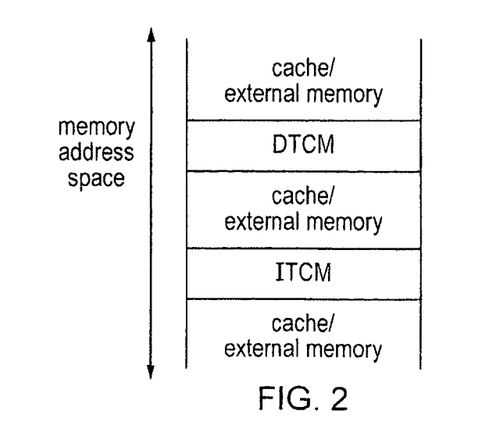
FIG. 2 illustrates an example of a memory address space.

The storage locations of the ITCM 6, the DTCM 8, the data cache 10 and the instruction cache 12 are mapped onto a memory address space. In simple embodiments this may be a physical address space, but the technique may also be used in embodiments employing virtual address space. In this case a virtual to physical address translation may also be required. An address mapping unit 26 is provided to map a target address that is the subject of an access request to a storage location within one of the storage units. As shown in FIG. 2, different regions of the address space may correspond to different ones of the storage units 6, 8, 10, 12. A storage unit may be allocated more than one region of the address space. When the processing circuitry 4 executes a data access instruction for requesting access to data at a target storage address, the address mapping unit 26 of the storage controller 24 determines which of the storage units 6, 8, 10, 12 contains the storage location identified by the target storage address. The address mapping unit 26 may store one or more address thresholds which define the boundaries of the regions of the address space allocated to each storage unit 6, 8, 10, 12. Address comparators may be provided in the address mapping unit 26 to compare a target storage address with the thresholds, in order to identify which storage unit 6, 8, 10, 12 contains the storage location corresponding to the target storage address.

The address mapping unit 26 requires a number of processing cycles to determine the target address of a read or write access request from the processing circuitry 4 and to determine which of the storage units 6, 8, 10, 12 contains the storage location identified by the target address. To improve processing performance, the processing apparatus 2 includes a target storage unit predictor 28 for predicting which of the storage units 6, 8, 10, 12 contains the target storage location. The target storage unit predictor 28 maintains a status flag 40, which is used to make the prediction of the predicted storage unit. The target storage unit predictor 28 predicts a predicted storage unit before the address mapping unit 26 has determined which storage unit actually contains the target storage location, so that the storage controller 24 can initiate a data access to the predicted storage unit without waiting for the address mapping unit 26 to determine the actual target storage unit. If the prediction is correct, then processing performance is improved since the data access is initiated several processing cycles earlier than if no prediction was made.

Prediction monitoring circuitry 30 is provided to detect whether the prediction made by target predictor 28 is correct, that is, whether the predicted storage unit is the same as the target storage unit determined by the address mapping unit 26. If the prediction is correct then processing is allowed to continue based on the data access from the predicted storage unit. If there was a misprediction then the storage controller 24 stalls processing operations that are dependent on the requested data and reinitiates the data access, this time issuing the access request to the target storage unit determined by the address mapping unit 26.

Figure 3A:
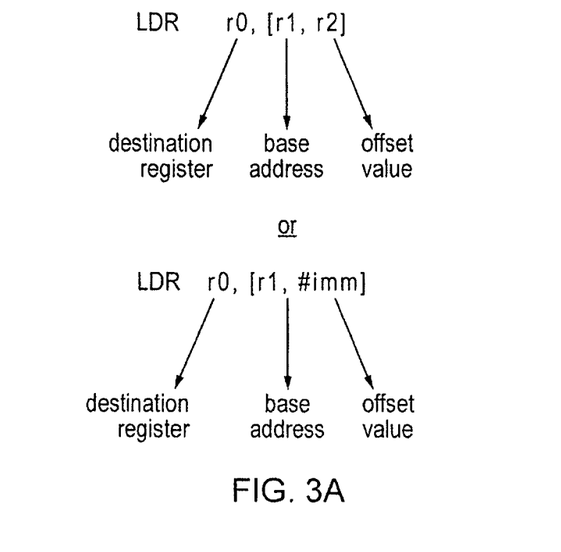
FIGS. 3A and 3B illustrate examples of different types of load instruction.
Figure 3B:
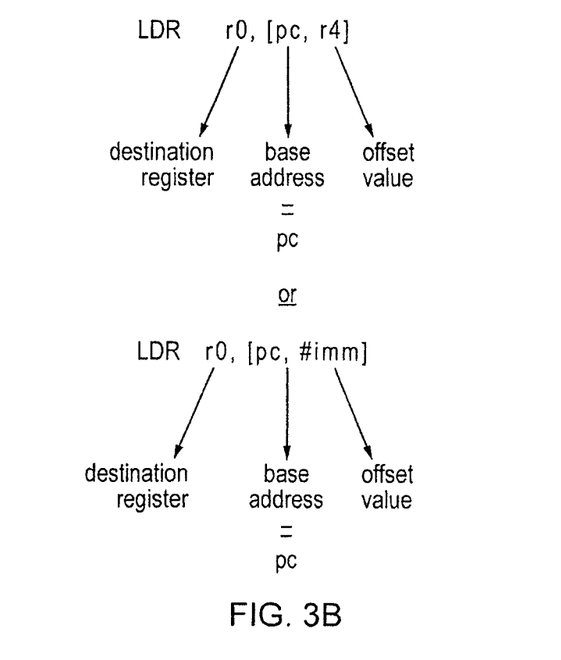

The target predictor 28 provides instruction type-specific predictions for predetermined types of program instruction. One example of such a type of instruction is a program-counter-relative load instruction. FIGS. 3A and 3B illustrate different types of load instruction.

FIG. 3A illustrates a load instruction for triggering a load of a data value from a storage location addressed by a target storage address. The load instruction of FIG. 3A is not program-counter-relative, because the target storage address is not determined using the program counter. The instruction of FIG. 3A defines a base address and an offset value which when added together identify the target storage address. The base address and offset value may be identified as an immediate value #imm, or with reference to a register of the register bank 16 that stores the relevant value. On execution of the load instruction, a data value is retrieved from the target storage location and loaded to a destination register identified by the load instruction.

FIG. 3B shows a different kind of load instruction for which the base address is identified as the address specified by the program counter 20. Hence, FIG. 3B shows an example of a program-counter-relative load instruction. On execution of the program-counter-relative load instruction, the value of the program counter 20 is read and added to an offset value identified directly or indirectly by the instruction to form the target storage address. The data value located at the storage location identified by the target storage address is loaded into a destination register. In some embodiments, the program counter 20 may be stored in one of the registers of the register bank 16 and so the program-counter-relative load instruction may be identified by the fact that the register indicating the base address is the register allocated to store the program counter 20.

Figure 4:
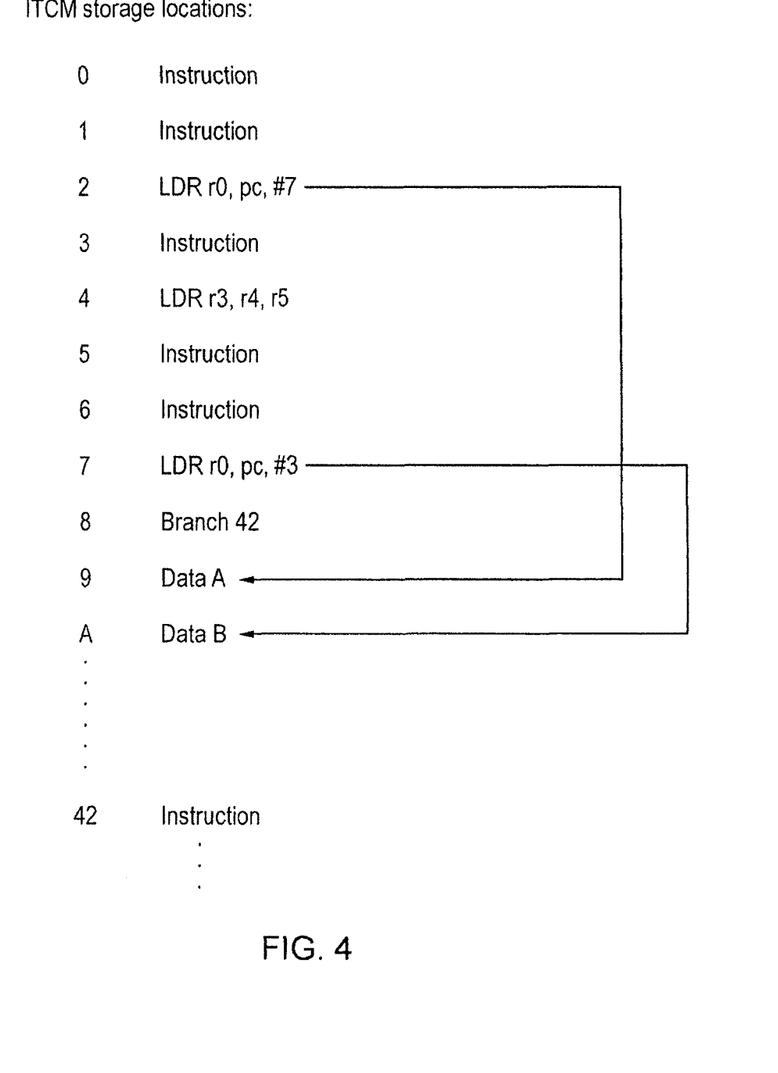
FIG. 4 illustrates an example of a sequence of instructions and literal values.

FIG. 4 shows an example stream of program instructions in which program-counter-relative load instructions are used to access literal values within the instruction stream. When the program-counter-relative instruction is executed then the program counter 20 will have the value of the storage address of the storage location storing that instruction, and this storage address will be used as the base address for the load access. The offset value identified by the instruction indicates the value to be added to the base address to arrive at the address of the desired literal data value. For example, the load instruction located at storage location 2 in FIG. 4 specifies the program counter 20 as the base address and an offset value of 7, and so the target storage address is therefore the storage location 9, which is seven storage locations further on from the storage location indicated by the program counter 20. The program-counter-relative load instructions are often used to access such literal values located within the instruction stream.

Often, the instruction tightly coupled memory (ITCM) 6 is used to store such streams of instructions containing literal values. Hence, it is reasonably likely that a program-counter-relative load instruction will access the instruction tightly coupled memory 6. Moreover, the use of program-counter-relative load instructions is likely to be reasonably consistent within a particular stream of instructions and so if one program-counter-relative load instruction accesses the ITCM 6, then it is likely that the next program-counter-relative load instruction will also access the ITCM 6. The target predictor 28 can exploit this correlation to make an efficient prediction of the target storage unit of a program-counter-relative load instruction, by predicting the predicted storage unit for the program-counter-relative load instruction based on the target storage unit determined for the previous program-counter-relative load instruction. In the example of FIG. 4, for example, when the program-counter-relative load instruction located at storage location 7 is executed, the target predictor 28 predicts the predicted storage unit based on the target storage unit determined for the program-counter-relative load instruction located at storage location 2 (the preceding instruction of the same type).

Figure 5:
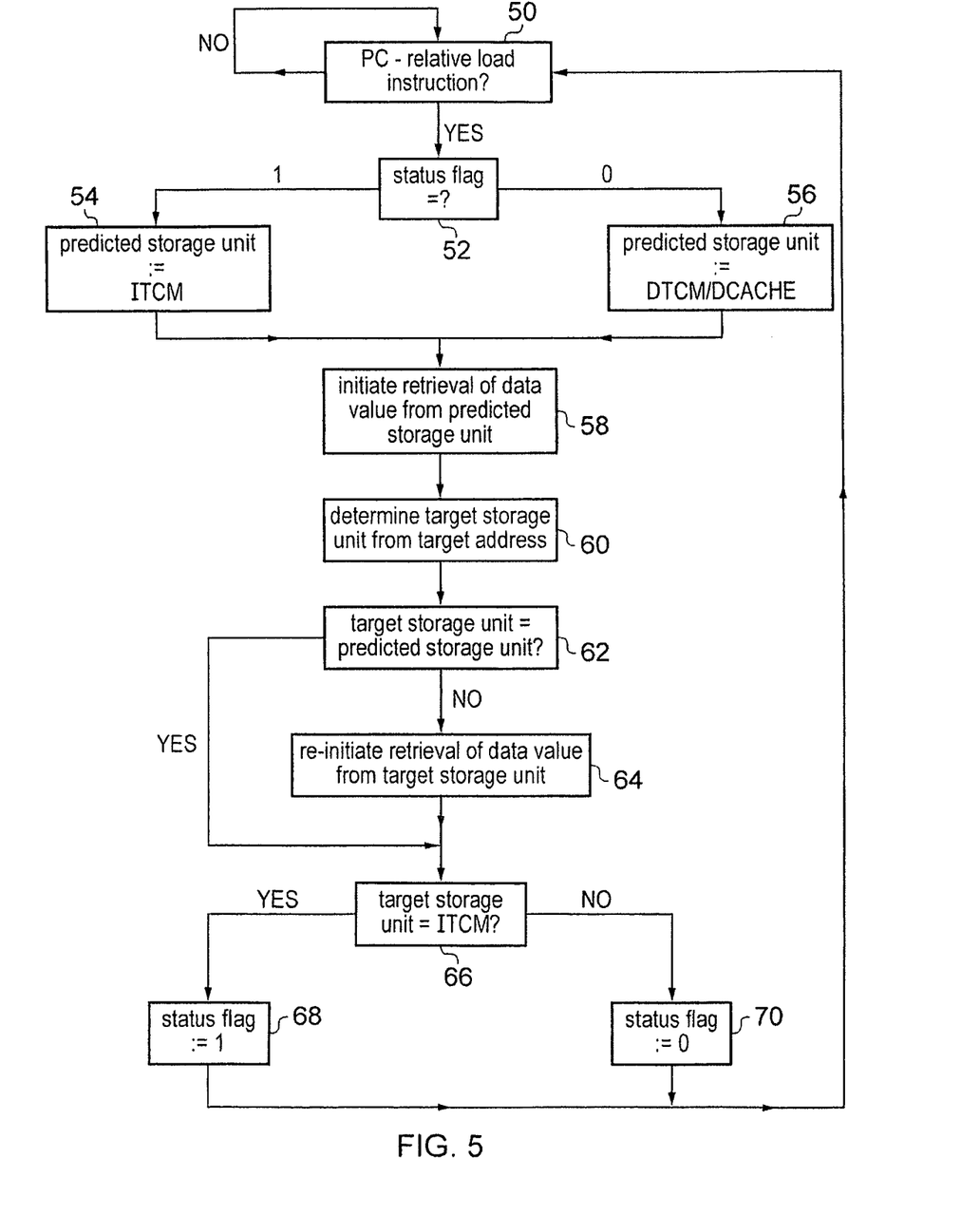
FIG. 5 schematically illustrates a method of predicting the target storage unit of a program-counter-relative load instruction.

FIG. 5 shows an example of a method of predicting the target storage unit of a program-counter-relative load instruction. At step 50, the predictor 28 detects whether or not the processing circuit 4 is currently executing a program-counter-relative load instruction. The program-counter-relative load instruction is any load instruction whose target address is calculated with reference to the program counter 20. The target predictor 28 waits until such an instruction is executed.

When the processing circuitry 4 is detected as executing a program-counter-relative load instruction, then at step 52 the prediction circuitry 28 checks the value of the status flag 40 maintained by the predication circuitry 28. If the status flag 40 has a first state (for example a value of 1) then at step 54 the prediction circuitry 28 predicts as the predicted storage unit the instruction tightly coupled memory 6. On the other hand, if the status flag 40 is in the second state (for example the status flag has a value of 0) then at step 56, the prediction circuitry 28 predicts as the predicted storage unit a storage unit other than the instruction tightly coupled memory 6 (e.g. the DTCM 8 or data cache 10). Any criteria may be used to select which of the other storage units is selected as the predicted storage unit at step 56. For example, one of the storage units 8, 10, 12 may be preferentially selected.

Irrespective of which storage unit is selected as the predicted storage unit at one of steps 54 and 56, then at step 58 the storage controller 24 initiates retrieval of the data value from the predicted storage unit. By initiating the data access before it has been determined which storage unit actually stores the target data value, processing performance can be improved.

At step 60, several processing cycles after the data access has been initiated, then the address mapping unit 26 of the storage controller 24 determines, based on the target storage address, the target storage unit which actually contains the data value sought by the processing circuitry 4. At step 62 the prediction monitoring circuitry 30 determines whether the target storage unit is the same as the predicted storage unit determined at one of steps 54 and 56. If the target storage unit is the same as the predicted storage unit then the prediction was correct, and the method proceeds to step 66. Otherwise, at step 64 the misprediction is corrected by reinitiating retrieval of the data value from the target storage unit determined at step 60.

At step 66, the prediction circuitry 28 determines whether or not the target storage unit is the instruction tightly coupled memory 6. If the target storage unit determined by the storage controller 24 is the instruction tightly coupled memory 6, then the status flag 40 is set to the first state at step 68, while if the target storage unit is not the instruction tightly coupled memory 6 then the status flag 40 is set to the second state at step 70.

Hence the combination of steps 50, 54, 56 and 66, 68, 70 ensures that the prediction circuitry 28 predicts as the predicted storage unit the instruction tightly coupled memory 6 if the previous program-counter-relative load instruction also accessed the instruction tightly coupled memory 6. By making a prediction based on the type of instruction and the behaviour of the preceding instruction of the same type, an efficient prediction can be made.

Figure 6:
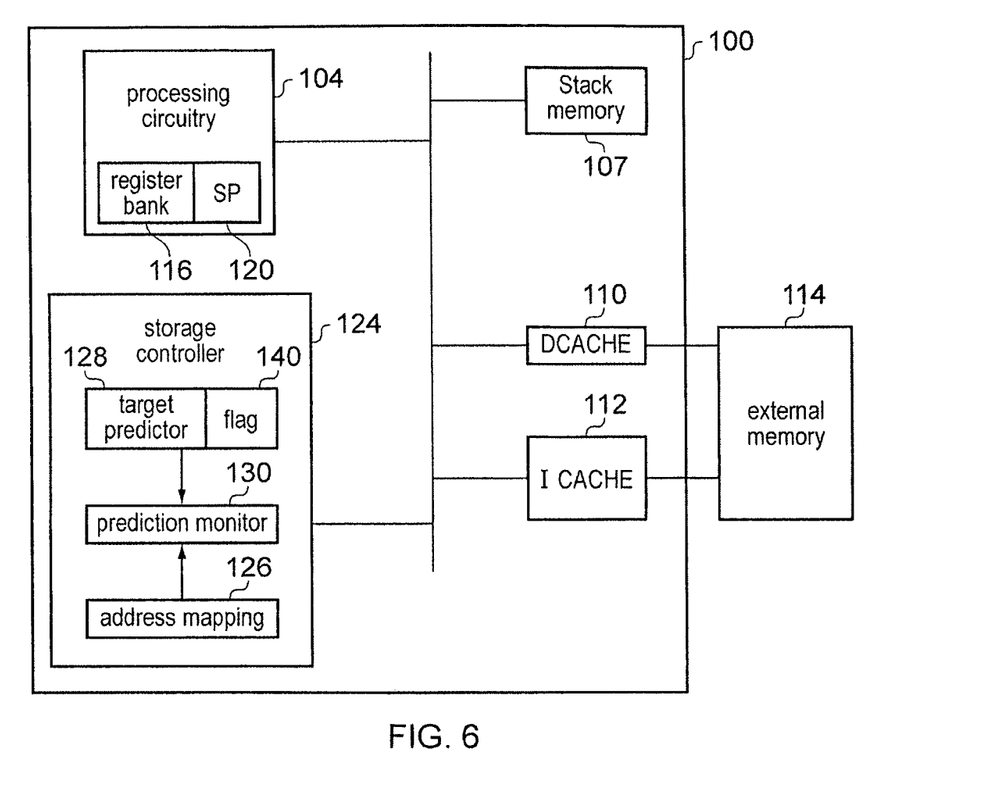
FIG. 6 schematically illustrates another example of processing apparatus having a plurality of storage units.

FIG. 6 shows another example of a data processing apparatus 100 comprising a processing circuit 104 and a plurality of storage units 107, 110, 112. As in the example FIG. 1, the storage units include a data cache 110 and an instruction cache 112 which store cached versions of data and instructions from external memory 114. In this example, the storage units also include a stack memory 107 for storing data values in a stack data structure. The processing circuit 104 maintains a stack pointer 120 which indicates a storage location representing the top of the stack data structure. The processing apparatus 100 comprises a storage controller 124 similar to the storage controller 24 of the apparatus 2 shown in FIG. 1.

Figure 7:
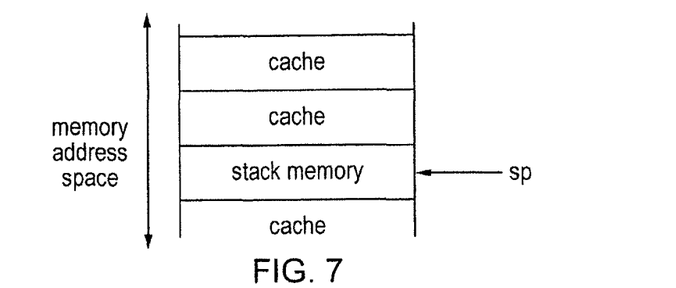
FIG. 7 schematically illustrates a memory address space including a range of addresses allocated to a stack memory.

FIG. 7 schematically illustrates an example of a memory address space shared by the storage units 107, 110, 112. Each storage unit may be allocated one or more ranges of memory addresses. The stack pointer 120 indicates the memory address representing the top of the stack data structure. When a data value is added to the stack data structure it is added at the top of the stack data structure, and when a data value is requested from the stack data structure it is taken from the top of the stack data structure. Hence, the stack data structure is a last-in-first-out (LIFO) data structure. Although generally the stack data structure is expected to be located within the stack memory 107, there may be instances where the stack data structure exceeds the space allocated within the stack memory 107 and so the data within the stack data structure may sometimes be located in one of the other storage units 110, 112. Hence, while it is reasonably likely that an instruction accessing the stack will target the stack memory 107, this is not certain and so the prediction circuitry 128 is provided to predict the target storage unit for a stack access instruction. Again, the prediction circuitry 128 may maintain a status flag 140 which is used to make the prediction.

Figure 8:
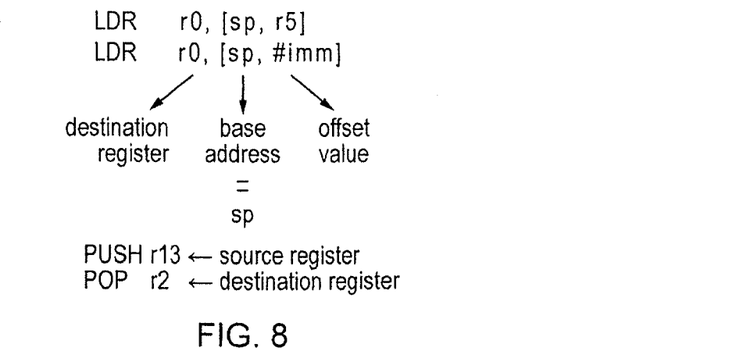
FIG. 8 schematically illustrates different types of stack access instruction.

FIG. 8 shows various examples of stack access instructions. A PUSH instruction controls the processing circuitry 104 to push a value contained within a source register of the register bank 116 onto the stack, that is, to write the value contained within the source register to a storage location having an address calculated with reference to the stack pointer 120. Similarly, a pop instruction controls the processing circuitry 104 to pop a value from the stack, that is, to load the value located at a storage location whose address is calculated with reference to the stack pointer into a destination register. Also, load instructions LDR similar to the instructions described with reference to FIGS. 3A and 3B may specify the stack pointer as the base address and so can be considered as stack access instructions which target a storage address calculated relative to the stack pointer 120.

Figure 9:
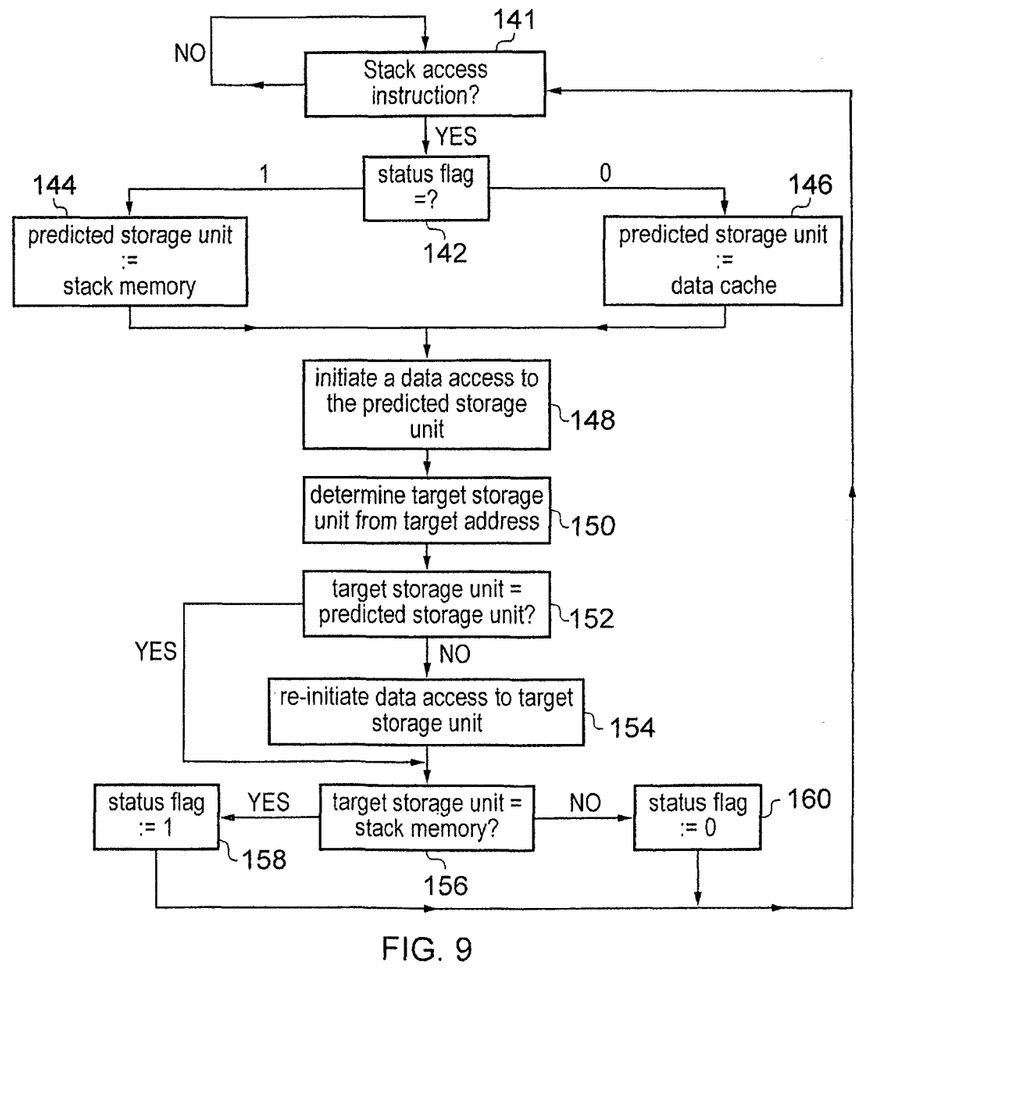
FIG. 9 schematically illustrates a method of predicting a target storage unit of a stack access instruction.

FIG. 9 shows an example of a method of predicting the target storage unit targeted by a stack access instruction. At step 141, the prediction circuitry 128 determines whether or not the processing circuitry 104 is executing a stack access instruction. The stack access instruction may be any load or store instruction whose target address is calculated with reference to the stack pointer 120. If the instruction currently executed by the processing circuitry 104 is not a stack access instruction, then the prediction circuitry 128 continues to monitor for stack access instructions.

When a stack access instruction is executed by the processing circuitry 104, then at step 142 the target predictor 128 determines the current state of the status flag 140. If the status flag has a first state (for example a value of 1) then at step 144 the prediction circuitry 128 predicts that the stack memory is the predicted storage unit. On the other hand, if the status flag has a second state (for example a value of 0) then at step 146 the prediction circuitry 128 predicts another storage unit (for example the data cache 110) as the predicted storage unit. At step 148, the storage controller 124 then initiates a data access to the predicted storage unit.

Several processing cycles later, at step 150 the address mapping unit 126 determines from the target storage address of the stack access instruction the storage unit 107, 110, 112 which actually contains the storage location corresponding to the target address. Then at step 152, the prediction monitoring circuitry 130 determines whether the prediction made by the prediction circuitry 128 was correct, that is, whether the target storage unit determined at step 150 is the same as the predicted storage unit predicted at step 144 or 146. If the predicted storage unit was not the same as the actual target storage unit, then at step 154 the storage controller 124 reinitiates the data access, this time using the target storage unit. On the other hand, if the predicted storage unit matched the target storage unit at step 152 then the prediction was correct and so step 154 is omitted.

At step 156, the prediction circuitry 128 determines whether the target storage unit determined at step 150 is the stack memory 107. If the target storage unit is the stack memory then at step 158 the prediction circuitry 128 places the status flag 140 in the first state, while if the target storage unit is not the stack memory 107 then at step 160 the prediction circuitry places the status flag 140 in the second state. The method then returns to step 141 where the prediction circuitry 128 again awaits execution of a stack access instruction by the processing circuitry 104.

Hence, the combination of steps 142, 144, 146 and 156, 158, 160 ensures that, when encountering a stack access instruction, the prediction circuitry 128 predicts the stack memory 107 as the predicted data storage unit if the preceding stack access instruction executed by the processing circuitry 104 accessed the stack memory as a target storage unit. This form of prediction is relatively efficient to implement, since the prediction is not dependent on the target storage address itself and so address comparators are not required in the target predictor 128.

While FIGS. 5 and 9 illustrate the status flag 40 having a first state where the status flag has a value of 1 and a second state where the status flag has a value of 0, it will be appreciated that any other way of indicating two different states of a status flag can also be used.

Although illustrative embodiments of the invention have been described herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus comprising:
processing circuitry configured to execute program instructions to process data;
a plurality of storage units comprising storage locations addressable by storage addresses;
a storage controller configured to control access to said plurality of storage units and when said processing circuitry executes a data access instruction to access a target storage location addressed by a target storage address, to identify, based on said target storage address, which of said plurality of storage units is a target storage unit that includes said target storage location; and prediction circuitry configured to detect whether said processing circuitry is executing a data access instruction of a predetermined type, and, upon detecting said processing circuitry executing said data access instruction of said predetermined type, to determine, based on the type of data access instruction, a predicted storage unit predicted to include said target storage location, wherein said storage controller is configured to initiate a data access to said predicted storage unit before said storage controller has identified said target storage unit, wherein said predetermined type of data access instruction is distinguished from at least one other type of data access instruction by at least one of a different opcode, a different addressing mode, and a different register referenced by the instruction.

2. The data processing apparatus according to claim 1, wherein, for said data access instruction of said predetermined type, said prediction circuitry is configured to determine said predicted storage unit based on which storage unit was identified by said storage controller as said target storage unit on execution of a previous data access instruction of said predetermined type.

3. The data processing apparatus according to claim 1, further comprising prediction monitoring circuitry configured to determine, after said storage controller has identified said target storage unit, whether said prediction circuitry correctly determined said predicted storage unit, and to control said storage controller to reinitiate said data access to said target storage unit if said prediction circuitry incorrectly predicted said predicted storage unit.

4. The data processing apparatus according to claim 1, wherein said prediction circuitry is part of said storage controller.

5. The data processing apparatus according to claim 1, wherein said storage controller is part of said processing circuitry.

6. The data processing apparatus according to claim 1, wherein:
said data processing apparatus comprises a program counter indicating a storage address of a storage location storing a program instruction currently being executed by said processing circuitry; and
said data access instruction of said predetermined type is a program-counter-relative load instruction for controlling said processing circuitry to request a data value from a target storage location addressed by a target storage address determined using said program counter.

7. The data processing apparatus according to claim 6, wherein said plurality of storage units includes a tightly coupled memory.

8. The data processing apparatus according to claim 7, wherein:
upon detecting said processing circuitry executing said program-counter-relative load instruction, said prediction circuitry determines as said predicted storage unit:
(i) said tightly coupled memory if, on execution of a previous program-counter-relative load instruction, said storage controller identified said tightly coupled memory as said target storage unit; and
(ii) another of said storage units if, on execution of said previous program-counter-relative load instruction, said storage controller identified a storage unit other than said tightly coupled memory as said target storage unit.

9. The data processing apparatus according to claim 7, wherein said prediction circuitry is configured to determine said predicted storage unit in dependence on a status flag indicating whether, on execution of said previous program-counter-relative load instruction, said storage controller identified said tightly coupled memory as said target storage unit.

10. The data processing apparatus according to claim 9, wherein said status flag has a first state and a second state, and said prediction circuitry is configured to:
determine said tightly coupled memory as said predicted storage unit if said status flag has said first state;
determine another of said storage units as said predicted storage unit if said status flag has said second state;
place said status flag in said first state if said storage controller identifies said tightly coupled memory as said target storage unit; and
place said status flag in said second state if said storage controller identifies a storage unit other than said tightly coupled memory as said target storage unit.

11. The data processing apparatus according to claim 6, wherein said program-counter-relative load instruction identifies an offset value, and said target storage address is the sum of said offset value and said storage address indicated by said program counter.

12. The data processing apparatus according to claim 6, wherein said program-counter-relative load instruction is one of a plurality of types of load instruction for controlling said processing circuitry to request a data value from a target storage location addressed by a target storage address;
each of said plurality of types of load instruction identifies a base address and an offset value, said target storage address being the sum of said base address and said offset value; and
for said program-counter-relative load instruction, said base address is said storage address indicated by said program counter.

13. The data processing apparatus according to claim 7, wherein said tightly coupled memory is an instruction tightly coupled memory for storing program instructions to be executed by said processing circuitry.

14. The data processing apparatus according to claim 13, wherein said plurality of storage units also include at least one of an instruction cache memory, a data cache memory, and a data tightly coupled memory.

15. The data processing apparatus according to claim 1, wherein said data processing apparatus comprises a stack pointer indicating a storage location of a stack data structure; and
said data access instruction of said predetermined type is a stack access instruction for controlling said processing circuitry to access a target storage location addressed by a target storage address determined using said stack pointer.

16. The data processing apparatus according to claim 15, wherein said plurality of storage units comprise a stack memory for storing said stack data structure; and
upon detecting said processing circuitry executing said stack access instruction, said prediction circuitry determines as said predicted storage unit:
(i) said stack memory if, on execution of a previous stack access instruction, said storage controller identified said stack memory as said target storage unit; and
(ii) another of said storage units if, on execution of said previous stack access instruction, said storage controller identified a storage unit other than said stack memory as said target storage unit.

17. A data processing apparatus comprising:
processing means for executing program instructions to process data;

a plurality of storage unit means for storing data, said storage unit means comprising storage locations addressable by storage addresses;

storage control means for controlling access to said plurality of storage unit means, wherein when said processing means executes a data access instruction to access a target storage location addressed by a target storage address, said storage control means identifies, based on said target storage address, which of said plurality of storage unit means is a target storage unit means that includes said target storage location; and prediction means for detecting whether said processing means is executing a data access instruction of a predetermined type, and, upon detecting said processing means executing said data access instruction of said predetermined type, for determining, based on the type of data access instruction, a predicted storage unit means predicted to include said target storage location, wherein said storage control means is configured to initiate a data access to said predicted storage unit means before said storage control means has identified said target storage unit means, wherein said predetermined type of data access instruction is distinguished from at least one other type of data access instruction by at least one of a different opcode, a different addressing mode, and a different register referenced by the instruction.

18. A data processing method for a data processing apparatus comprising processing circuitry configured to execute program instructions to process data, and a plurality of storage units comprising storage locations addressable by storage addresses; said method comprising the steps of:

detecting whether said processing circuitry is executing a data access instruction of a predetermined type for controlling said processing circuitry to access a target storage location addressed by a target storage address;

upon detecting said processing circuitry executing said data access instruction of said predetermined type, determining, based on the type of data access instruction, a predicted storage unit predicted to include said target storage location;

initiating a data access to said predicted storage unit; and after initiating said data access to said predicted storage unit, identifying, based on said target storage address, which of said plurality of storage units is a target storage unit that actually includes said target storage location, wherein said predetermined type of data access instruction is distinguished from at least one other type of data access instruction by at least one of a different opcode, a different addressing mode, and a different register referenced by the instruction.

19. A data processing apparatus comprising:

processing circuitry configured to execute program instructions to process data;

a plurality of storage units comprising storage locations addressable by storage addresses, said plurality of storage units including a tightly coupled memory;

a storage controller configured to control access to said plurality of storage units;

a program counter indicating a storage address of a storage location storing a program instruction currently being executed by said processing circuitry, wherein said storage controller is configured, when said processing circuitry executes a program-counter-relative load instruction for controlling said processing circuitry, to request a data value from a target storage location addressed by a target storage address determined using said program counter, and to identify, based on said target storage address, which of said plurality of storage units is a target storage unit that includes said target storage location; and prediction circuitry configured to detect whether said processing circuitry is executing said program-counter-relative load instruction and, upon detecting said processing circuitry executing said program-counter-relative load instruction, to determine a predicted storage unit predicted to include said target storage location as:

(i) said tightly coupled memory if, on execution of a previous program-counter-relative load instruction, said storage controller identified said tightly coupled memory as said target storage unit; and (ii) another of said storage units if, on execution of said previous program-counter-relative load instruction, said storage controller identified a storage unit other than said tightly coupled memory as said target storage unit; and said storage controller is configured to initiate retrieval of said data value from said predicted storage unit before said storage controller has identified said target storage unit, wherein said program-counter-relative load instruction is distinguished from at least one other type of data access instruction by at least one of a different opcode, a different addressing mode, and a different register referenced by the instruction.

* * * * *